(12) United States Patent
Matsushima et al.

(10) Patent No.: US 7,792,755 B2
(45) Date of Patent: *Sep. 7, 2010

(54) SERVICE PROVIDING APPARATUS AND METHOD THAT ALLOW AN APPARATUS TO ACCESS UNIQUE INFORMATION STORED IN TRANSPORTABLE RECORDING MEDIUM

(75) Inventors: Hideki Matsushima, Studio City, CA (US); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 210 days.

This patent is subject to a terminal disclaimer.

(21) Appl. No.: 11/368,536

(22) Filed: Mar. 7, 2006

(65) Prior Publication Data

US 2006/0178996 A1 Aug. 10, 2006

Related U.S. Application Data

(60) Division of application No. 09/936,610, filed on Sep. 14, 2001, now Pat. No. 7,065,503, which is a continuation-in-part of application No. 09/482,521, filed on Jan. 14, 2000, now abandoned.

(51) Int. Cl.
*G06F 21/00* (2006.01)

(52) U.S. Cl. .......................................... 705/51; 705/73
(58) Field of Classification Search .................. 705/18, 705/50, 51; 713/185, 201; 726/7, 16, 26, 726/27

See application file for complete search history.

(56) References Cited

U.S. PATENT DOCUMENTS

| | | | |
|---|---|---|---|
| 4,677,604 A | 6/1987 | Selby, III et al. | |
| 4,890,319 A | 12/1989 | Seth-Smith et al. | |
| 5,513,169 A | 4/1996 | Fite et al. | |
| 5,917,913 A | 6/1999 | Wang | |
| 5,943,423 A | 8/1999 | Muftic | |
| 5,956,034 A * | 9/1999 | Sachs et al. | 715/776 |
| 6,226,752 B1 | 5/2001 | Gupta et al. | |
| 6,351,810 B2 | 2/2002 | Gupta | |
| 6,601,169 B2 * | 7/2003 | Wallace et al. | 713/151 |
| 6,671,808 B1 * | 12/2003 | Abbott et al. | 726/4 |
| 6,738,749 B1 * | 5/2004 | Chasko | 705/17 |
| 7,272,723 B1 * | 9/2007 | Abbott et al. | 713/185 |
| 2005/0010647 A1 | 1/2005 | Durham | |

* cited by examiner

*Primary Examiner*—Evens J Augustin
*Assistant Examiner*—Jamie Kucab
(74) *Attorney, Agent, or Firm*—Wenderoth, Lind & Ponack, L.L.P.

(57) ABSTRACT

A transportable recording medium includes an area for storing encrypted cookie information. The same cookie information is thus easy to use in different terminals and the cookie information becomes unique to respective users instead of respective terminals. A Web site reads the encrypted cookie information, decrypts the encrypted cookie information using a secret key stored in the Web site, customizes a requested service according to the decrypted cookie information, and provides the customized service to a terminal. If the Web site stores non-encrypted user information, the recording medium stores a media identification. The Web site stores the user information so that the user information of the user assigned to the recording medium is searched for according to the media identification. The Web site reads the media identification from the recording medium, searches for user information corresponding to the media identification, and customizes a requested service according to the user information.

16 Claims, 12 Drawing Sheets

FIG. 4

| USER NAME | ARAMIS |
|---|---|
| SEX | MALE |
| AGE | 27 |
| DATE OF BIRTH | 090872 |
| JOB | ENGINEER |
| ADDRESS | ○○WARD, TOKYO |
| TELEPHONE NUMBER | 555-777-XXXX |
| MAIL ADDRESS | Aramis@zzz |
| CARD NUMBER | 123.... |
| NUMBER OF TIMES THE SITE HAS BEEN VISITED | 11 |
| DATE AND TIME OF SITE VISIT | a10:30  12/07/99 |
| HOBBY 1 | SOCCER |
| HOBBY 2 | TRAVEL |
| ... | ... |

FIG. 11

| | | |
|---|---|---|
| MEDIA ID | ID1 | ID2 |
| USER NAME | ARAMIS | RYAN |
| SEX | MALE | FEMALE |
| AGE | 27 | 24 |
| DATE OF BIRTH | 090872 | 060575 |
| JOB | ENGINEER | STUDENT |
| ADDRESS | ○○WARD, TOKYO | ××CITY, OSAKA |
| TELEPHONE NUMBER | 555-777-XXXX | 555-777-△△△△ |
| MAIL ADDRESS | Aramis@zzz | Ryan@zzz |
| CARD NUMBER | 123.... | 456.... |
| NUMBER OF TIMES THE SITE HAS BEEN VISITED | 11 | 1 |
| DATE AND TIME OF SITE VISIT | a10:30 12/07/99 | p9:30 11/25/99 |
| HOBBY 1 | SOCCER | COOKING |
| HOBBY 2 | TRAVEL | TRAVEL |
| ... | ... | ... |

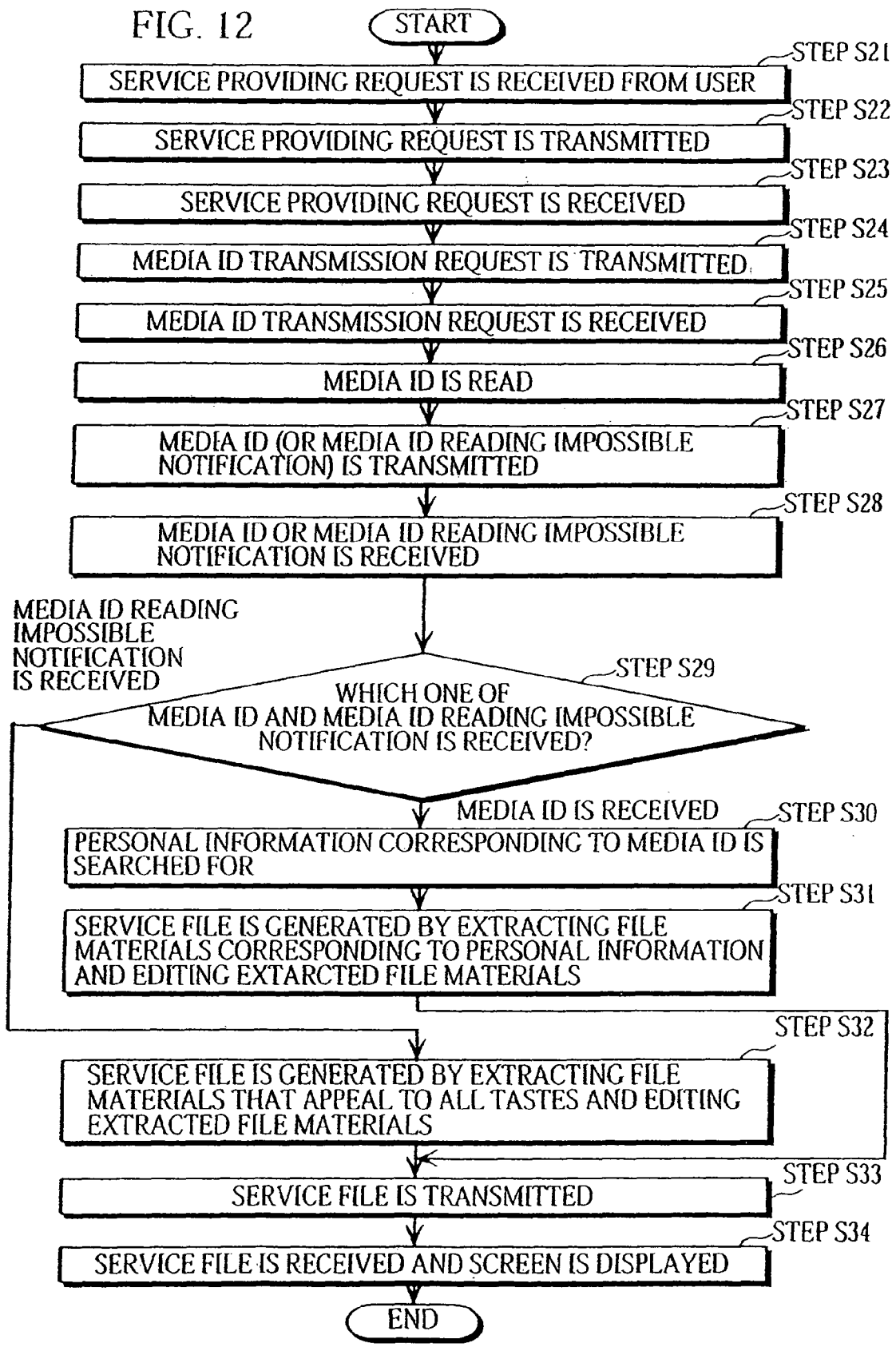

SERVICE PROVIDING APPARATUS AND METHOD THAT ALLOW AN APPARATUS TO ACCESS UNIQUE INFORMATION STORED IN TRANSPORTABLE RECORDING MEDIUM

This is a divisional of U.S. application Ser. No. 09/936,610, filed Sep. 14, 2001, now U.S. Pat. No. 7,065,503 which is a continuation-in-part under 35 U.S.C. §120 of U.S. application Ser No. 09/482,521, filed Jan 14, 2000, now abandoned, which is incorporated herein by reference.

BACKGROUND OF THE INVENTION

1. Field of the Invention

The present invention relates to data communication between a user's apparatus and another apparatus, such as the access from a terminal on the Internet to a Web site. More particularly, the present invention relates to a technique of facilitating the handling of personal information of each user and enhancing the security of the personal information.

2. Description Of The Related Art

In recent years, the Internet has become increasingly popular, and more and more services are being provided on the Internet. A major service offered on the Internet is the World Wide Web (WWW), which is a client/server-type information search system. In the WWW, server apparatuses (Web sites) provide information in HTML files and users of the Internet browse the information using browsing software called Web browsers at terminals (Web clients). Various information and services are currently provided at numerous Web sites, and a technology called "cookies" is widely used to provide information with efficiency. When a user enters a Web site) the Web site stores data, such as personal information of the user, as a cookie in the terminal of the user through the Web browser. The next time the user goes to the same Web site using the same terminal, the Web site reads the cookie from the terminal and uses the read cookie to provide information to the user.

Cookies usually show personal information of users, the last dates and times the users visited Web sites, and the numbers of times the users have visited the Web sites. Cookies are also used to identify users. Therefore, cookies are used as an element of technology in various authentication systems and personalizing systems that customize services provided in the WWW for respective users and provide the customized services to the users.

While being a useful technology, cookies also have the following problems. One problem is that Web sites store data, such as personal information of users, into terminals with which the users visit the Web sites. If a single user uses a plurality of terminals or a plurality of users share a single terminal or a plurality of terminals, Web sites cannot correctly obtain and use information of respective users with cookies. Also, if a user replaces an old terminal with new one, data stored as a cookie in the old terminal does not exist in the new terminal. Therefore, to continuously use the cookie even after the replacement of the terminal, the user needs to copy the cookie from the old terminal to the new terminal, which constitutes a burden on the user.

Another problem is that personal information of users may be automatically stored as cookies without the users intending to do so, and even other Web sites, which are not the sites that stored cookies, may refer to the cookies with relative ease. Consequently, there may be cases where cookies are maliciously read, causing user's privacy to be violated or making users a victim of cyber fraud. This generates demand for the enhancement of the security of personal information.

SUMMARY OF THE INVENTION

The object of the present invention is therefore to provide a service providing apparatus, a service providing method, and a service providing program for use with a technology, such as cookies, that customizes services which are provided via a network for respective users. Each of the service providing apparatus, the service providing method, and the service providing program correctly handles information which is unique to each user even if a single user uses a plurality of terminals or a plurality of users shares a single terminal or a plurality of terminals. Each of the service providing apparatus, the service providing method, and the service providing program also eliminates the need for users to perform burdensome operations, such as the copy of data, even if the users replace old apparatuses with new ones. Each of the service providing apparatus, the service providing method, and the service providing program further enhances the security of personal information. The object of the present invention is also to provide a recording medium that stores the service providing program and a recording medium that stores cookie information.

The stated object is achieved by a service providing method of providing a current user of a first apparatus with each of the services that are provided by a plurality of other apparatuses via a network, where the first apparatus is able to communicate with each of the plurality of other apparatuses via the network and is locally connectable to a recording medium from among recording media that are uniquely assigned to users of the first apparatus, and each recording medium is transportable and includes an area for storing unique information. The service providing method includes: a service requesting step where the first apparatus requests a second apparatus to provide a service that is desired by the current user, the second apparatus being one of the plurality of other apparatuses; a unique information reading step where: if a recording medium of the current user is locally connected to the first apparatus and stores unique information, the second apparatus reads the unique information in the locally connected recording medium via the first apparatus and the network; and a service providing step where the second apparatus customizes the desired service according to the read unique information and transmits the customized service to the first apparatus.

With this method, an apparatus on the network reads the unique information stored in a transportable recording medium and customizes a service according to the read unique information.

Also, if users are uniquely provided with recording media, the users are in a one-to-one correspondence with the recording media even if the users are not in a one-to-one correspondence with terminals. Therefore, when a user browses a Web site, personal information of the user is correctly obtained from the user's recording medium. Also, even after replacing an old terminal with a new one, the user can continuously receive the same service by simply connecting the user's recording medium to the new terminal.

Here, in the unique information reading step, if unique information is not stored in the locally connected recording medium or a recording medium is not locally connected to the first apparatus, the second apparatus may not read unique information from anywhere. Furthermore, in the service providing step, if no unique information has been read in the unique information reading step, the second apparatus may transmit the desired service to the first apparatus in an uncustomized state.

With this method, if the unique information is not read, the apparatus provides the user with a service that is not customized.

This allows the user to receive a service even without unique information. Also, because the unique information is stored only in the recording medium, the security of the unique information is enhanced.

Here, the unique information stored in each recording medium may include user information that is inherent to a user which is assigned the recording medium, and in the service providing step, the second apparatus may customize the desired service for the current user according to the user information that is included in the read unique information and transmit the customized service to the first apparatus.

With this method, the apparatus reads user information included in the unique information stored in the transportable recording medium and customizes the service for the user according to the user information.

Also, because the user information is stored in the transportable recording medium, the user can continuously use the same personal information without difficulty, even after replacing an old terminal with a new one.

Here, the service providing method may further include: a user information updating step, which is performed after the unique information reading step, where if the user information that is inherent to the current user needs to be updated, the second apparatus updates the user information that is included in the read unique information and overwrites the user information in the locally connected recording medium with the updated user information via the network and the first apparatus.

With this method, if the user information needs to be updated, the second apparatus updates the user information. This makes it easy to manage the user information.

Here, the user information in each recording medium may have been encrypted by using a public key of a public key cryptosystem, the second apparatus may store a secret key corresponding to the public key, the second apparatus may decrypt the encrypted user information by using the secret key and customize the desired service according to the decrypted user information in the service providing step, and the second apparatus may update the decrypted user information, encrypt the updated user information by using the public key, and overwrite the encrypted user information in the locally connected recording medium with the updated and encrypted user information in the user information updating step.

With this method, user information that has been encrypted by using a public key is transmitted and received. As a result, the encrypted user information is read only by an authorized apparatus that stores a secret key.

Here, the network may be the Internet, the first apparatus may be an Internet terminal that Iruns a specialized Internet browser, each of the plurality of other apparatuses may be a Web site, the unique information stored in each recording medium may include cookie information that is used through the Internet browser, and each recording medium may store the cookie information as a file.

With this method, cookie information that has conventionally been recorded on a hard disc is stored in a transportable recording medium.

This reduces the possibility that the cookie information may be maliciously read, which would cause a user's privacy to be violated or make the user a victim of cyber fraud.

Here, the unique information stored in each recording medium may include a media identifier of the recording medium, the second, apparatus may store user information so that user information that is inherent to each user is associated with the media identifier of the recording medium assigned to the user, and the service providing step may include: a user information finding substep where the second apparatus finds user information associated with the media identifier included in the read unique information; and a customizing substep where the second apparatus customizes the desired service for the current user according to the found user information.

This allows the second apparatus to search for user information corresponding to the media identifier included in the unique information that is stored in the transportable recording medium and to customize the service for the user according to the user information.

Therefore, even after replacing an old terminal with a new one, the user can continuously receive the same service with the recording medium that is uniquely assigned to the user. Also, because the user information does not reside in the user's terminal, the possibility is reduced that the user information may be maliciously read from the user's terminal, which would cause a user's privacy to be violated or make the user a victim of cyber fraud.

Here, the service providing method may further include: a recording medium connection step, which is performed before the service requesting step, where the first apparatus is locally connected to the recording medium that is assigned to the current user.

With this method, the recording medium is uniquely assigned to the user of the first apparatus and is locally connected to the first apparatus.

Because the user uses the uniquely assigned recording medium, personal information is correctly obtained for the user.

Here, the unique information stored in each recording medium may include a media identifier of the recording medium and user information that is inherent to a user which is assigned the recording medium, where the user information has been encrypted. Furthermore, the service providing step may include: a user password receiving substep where the second apparatus receives a user password from the current user via the first apparatus; a decryption key generating substep where the second apparatus generates a decryption key from the media identifier that is included in the read unique information and the received user password; a decryption substep where the second apparatus decrypts the encrypted user information that is included in the read unique information by using the generated decryption key; and a customizing substep where the second apparatus customizes the desired service for the current user according to the decrypted user information.

With this method, the encrypted user information is decrypted by using the decryption key generated from the media identifier and the user password. This enhances the security of the user information.

Here, each recording medium may include a secure data area, the media identifier of each recording medium may be stored in the secure data area of the recording medium. Furthermore, the unique information reading step may include: a device authentication substep where a device authentication is performed between the first apparatus and the locally connected recording medium; and a reading prohibition substep where, if the device authentication has ended in failure, the second apparatus is prohibited from reading data from the secure data area of the locally connected recording medium.

With this method, if the device authentication has ended in failure, the media identifier is not read. This enhances the security of the user information.

BRIEF DESCRIPTION OF THE DRAWINGS

These and other objects, advantages and features of the present invention will become more apparent from the following detailed description when taken in conjunction with the accompanying drawings which illustrate specific embodiments of the present invention. In the drawings:

FIG. 4 shows an example of the content of personal information that is written by a writing unit into a non-secure data area of the recording medium;

FIG. 11 shows an example of the content of the personal information that is stored in a storing unit; and FIG. 12 is a flowchart showing the processing procedure of the information processing system of the second embodiment.

DETAILED DESCRIPTION OF THE PREFERRED EMBODIMENTS

First Embodiment

<Overview>

In an information processing system 100 of the first embodiment of the present invention, the data area for storing cookies is reserved in a transportable recording medium. This allows the cookies to be used in different terminals by simply connecting the transportable recording medium to the respective terminals. This also allows cookies, which have conventionally been unique to respective terminals, become unique to respective users.

The recording medium includes a secure data area that stores a media identifier and is accessible only by terminals whose authenticities have been proven by the device authentication with the recording medium. The recording medium also includes a data area that is not secure and stores a cookie, such as user information, that has been encrypted by using a public key that is obtained under a public key cryptosystem. It should be noted here that the data area that is not secure is hereinafter referred to as the "non-secure data area".

A Web site which is requested by an authorized terminal to provide a service reads the media identifier from the secure data area via the terminal, and identifies the user of the terminal by using the read media identifier. The Web site also reads the encrypted cookie from the non-secure data area, decrypts the read cookie by using a secret key stored in the Web site, customizes the service according to the decrypted cookie, and provides the customized service to the terminal.

It should be noted here that if the device authentication between the recording medium and the terminal has ended in failure, the media identifier is not read and the Web site cannot identify the user.

Also, unauthorized Web sites do not store the secret key, and as a result, the encrypted cookie cannot be decrypted by the unauthorized Web sites. Therefore, the security of personal information is enhanced as compared to a conventional system.

<Construction>

Figure 1:
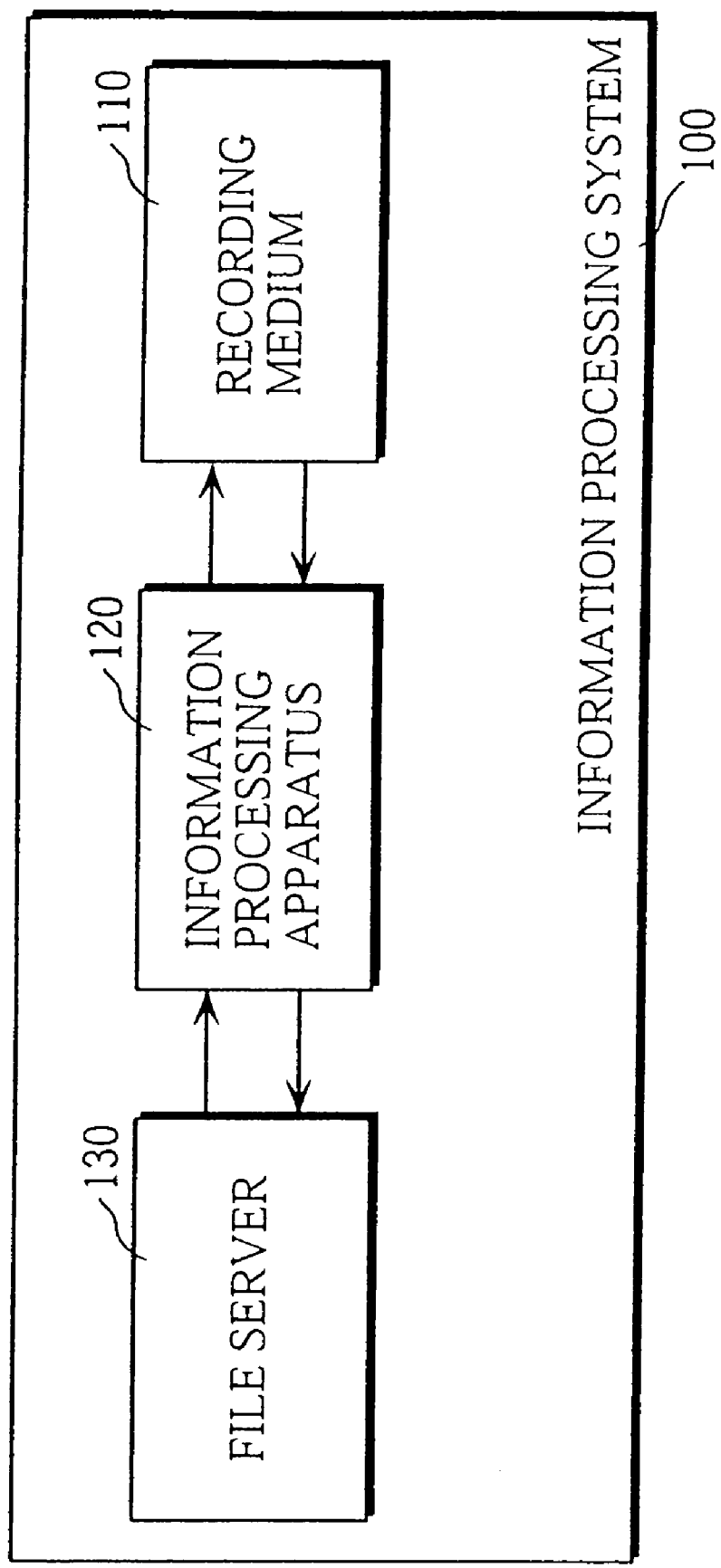
FIG. 1 shows the construction of an information processing system of the first embodiment of the present invention.

FIG. 1 shows the construction of the information processing system 100 of the first embodiment.

The information processing system 100 includes a recording medium 110, an information processing apparatus 120, and a file server 130.

The recording medium 110 is, for instance, a semiconductor medium, such as a memory card, and a user locally connects the recording medium 110 to the information processing apparatus 120 via a port, a slot, or the like.

The information processing apparatus 120 is a client apparatus, such as an Internet terminal, that runs a specialized Web browser and is connected to a network, such as the Internet. The information processing apparatus 120 is connected to the file server 130 via the network, issues an access request to the file server 130, and browses information that is provided in HTML files by the file server 130.

The file server 130 is a server apparatus, such as a Web site, that is connected to a network, such as the Internet. The file server 130 is connected to the information processing apparatus 120 via the network and provides information in the form of HTML files to the information processing apparatus 120.

It should be noted here that the information processing apparatus 120 is not limited to an Internet terminal and may be any other device that can access the information provided by the file server 130 via the network. For instance, the information processing apparatus 120 may be an Internet-accessible TV, a STB (set top box), a radio cassette tape recorder, a microwave oven, or a refrigerator.

Figure 2:
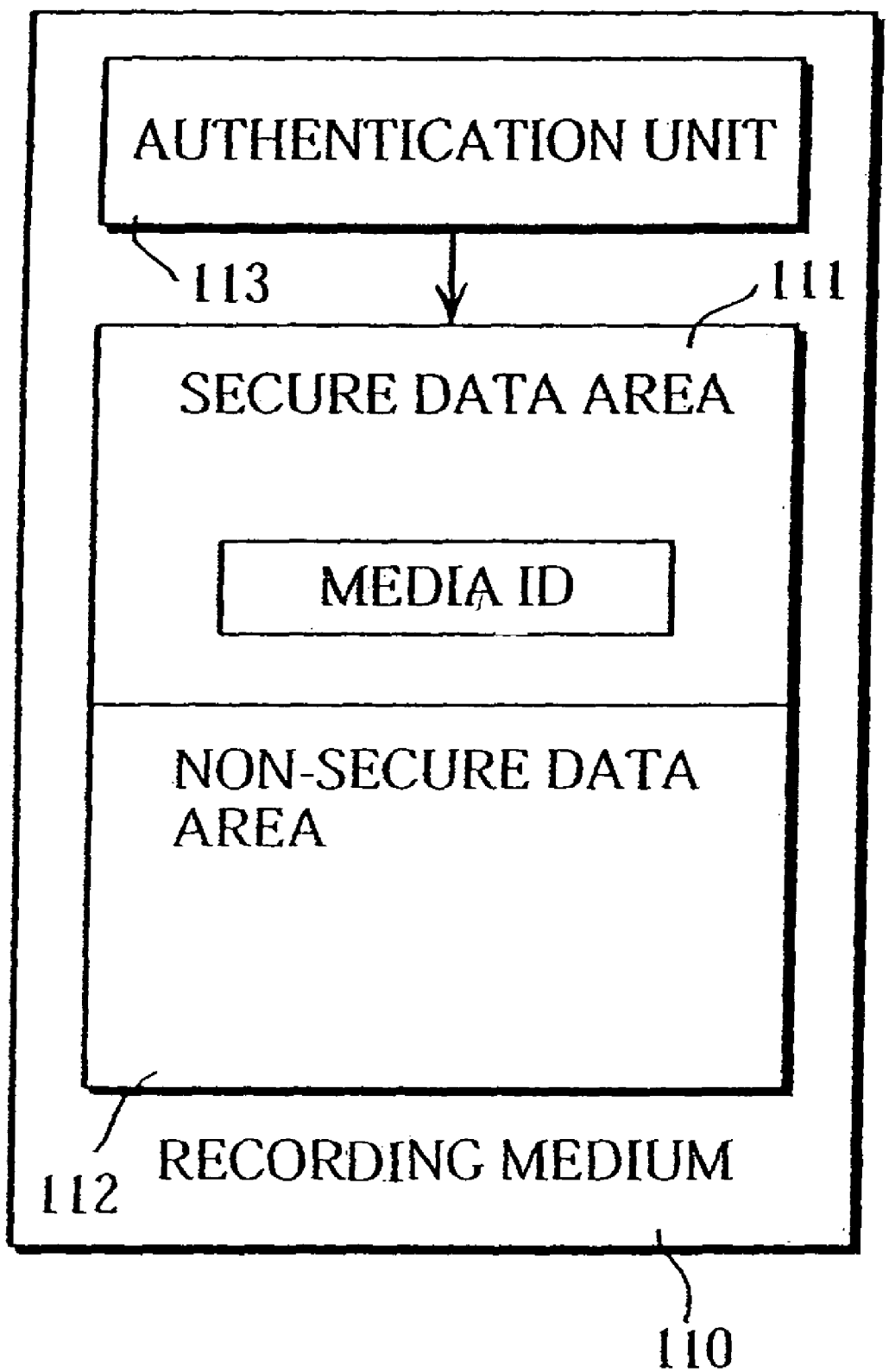
FIG. 2 shows the detailed construction of a recording medium.

FIG. 2 shows the detailed construction of the recording medium 110.

As shown in FIG. 2, the recording medium 110 includes a secure data area 111, a non-secure data area 112, and an authentication unit 113. A media ID is stored in the secure data area 111.

It should be noted here that media IDs are identifiers which are unique to respective recording media, and the media IDs are used to identify users and to generate encryption keys.

The authentication unit 113 performs an existing device authentication, such as a mutual authentication, with an apparatus to which the recording medium 110 is connected. In this first embodiment, the authentication unit 113 performs a mutual authentication with an authentication unit 124 of the information processing apparatus 120.

The secure data area 111 is a storage area that cannot be accessed without an access right. That is, the information processing apparatus 120 can access the secure data area 111 only if the device authentication between the recording medium 110 and the information processing apparatus 120 has succeeded.

The non-secure data area 112 is a storage area that can be freely accessed. That is, the information processing apparatus 120 can access the non-secure data area 112 even if the device authentication between the recording medium 110 and the information processing apparatus 120 has ended in failure.

Figure 3:
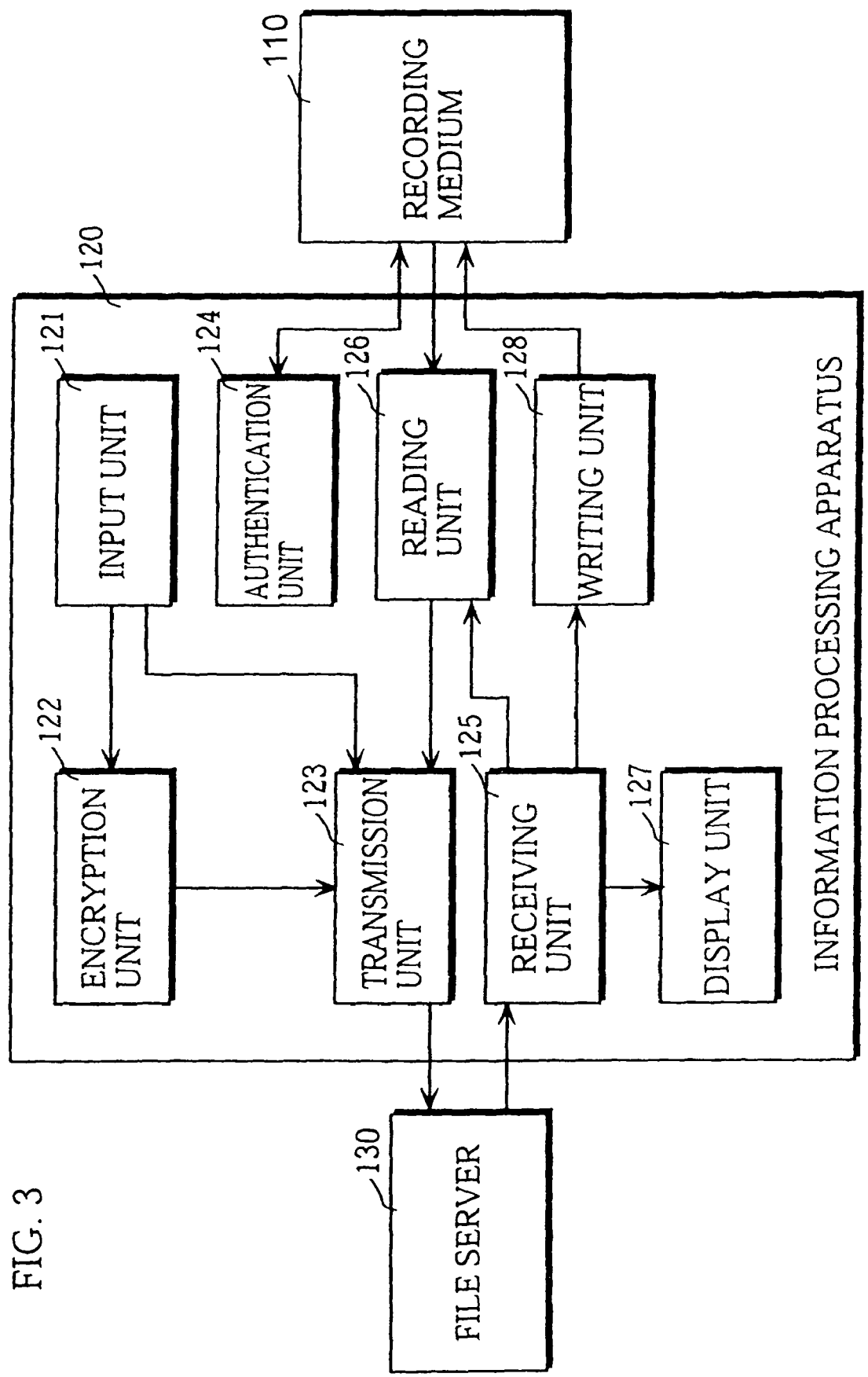
FIG. 3 shows the construction of an information processing apparatus.

FIG. 3 shows the construction of the information processing apparatus 120.

As shown in FIG. 3, the information processing apparatus 120 includes an input unit 121, an encryption unit 122, a transmission unit 123, an authentication unit 124, a receiving unit 125, a reading unit 126, a display unit 127, and a writing unit 128.

The input unit 121 is an input device, such as a combination of a mouse and a keyboard, and receives various inputs from a user. In this first embodiment, the input unit 121 receives a service providing request and personal information from the user. Here, the service providing request is a request for providing a service. Also, the personal information is information which is unique to the user, such as the user's name, age, date of birth, sex, family, hobby, taste, address, telephone number, job, E-mail address, credit card number, and password.

The encryption unit 122 encrypts the personal information received by the input unit 121. Here, the encryption unit 122 receives a public key that has been obtained under a public key cryptosystem, such as a RSA cryptosystem, from the file server 130 and prestores the public key. The encryption unit 122 encrypts the personal information by using the public key.

The transmission unit 123 transmits, to the file server 130, the service providing request received by the input unit 121, the media ID read by the reading unit 126, the personal information encrypted by the encryption unit 122, and the encrypted personal information read by the reading unit 126. Here, if the reading unit 126 does not read personal information, the transmission unit 123 transmits a personal information unregistered notification, instead of the personal information. The personal information unregistered notification is a notification showing that no personal information has been read. The authentication unit 124 performs an existing device authentication, such as a mutual authentication, with a recording medium that is connected to the information processing apparatus 120.

In this first embodiment, the authentication unit 124 performs a mutual authentication with the authentication unit 113 of the recording medium 110.

The receiving unit 125 receives, from the file server 130, a media ID transmission request, a personal information transmission request, a service file, data for a personal information registration screen, and encrypted personal information. Here, the media ID transmission request is a request for transmitting the media ID, and the personal information transmission request is a request for transmitting the personal information. Also, the personal information registration screen is a screen for allowing the user to register personal information. Further, in addition to the information items of the personal information received by the input unit 121, the personal information received by the receiving unit 125 includes information concerning the Web site (the file server 130), such as the last date and time the user visited the Web site and the number of times the user has visited the Web site. The service file contains screen data which is provided as part of the service that the user requested by issuing the service providing request. The screen data is, for instance, used to display various information screens or a screen explaining an operating procedure.

The reading unit 126 reads, if a media ID transmission request is received by the receiving unit 125, the media ID from the secure data area 111 of the recording medium 110. Also, if a personal information transmission request is received by the receiving unit 125, the reading unit 126 reads the personal information from the non-secure data area 112 of the recording medium 110. It should be noted here that if the device authentication between the recording medium 110 and the information processing apparatus 120 has ended in failure, the access to the secure data area 111 is prohibited so that the reading unit 126 cannot read the media ID from the secure data area 111.

The display unit 127 displays a personal information registration screen according to the data for the personal information registration screen that is received by the receiving unit 125. The display unit 127 also displays a service screen for the user according to the service file that is received by the receiving unit 125. The service screen is a screen which is displayed as part of the service that the user requested by issuing the service providing request.

The writing unit 128 writes encrypted personal information, which have been received by the receiving unit 125, into the non-secure data area 112 of the recording medium 110.

FIG. 4 shows an example of the content of the personal information that is written by the writing unit 128 into the non-secure data area 112 of the recording medium 110.

Figure 5:
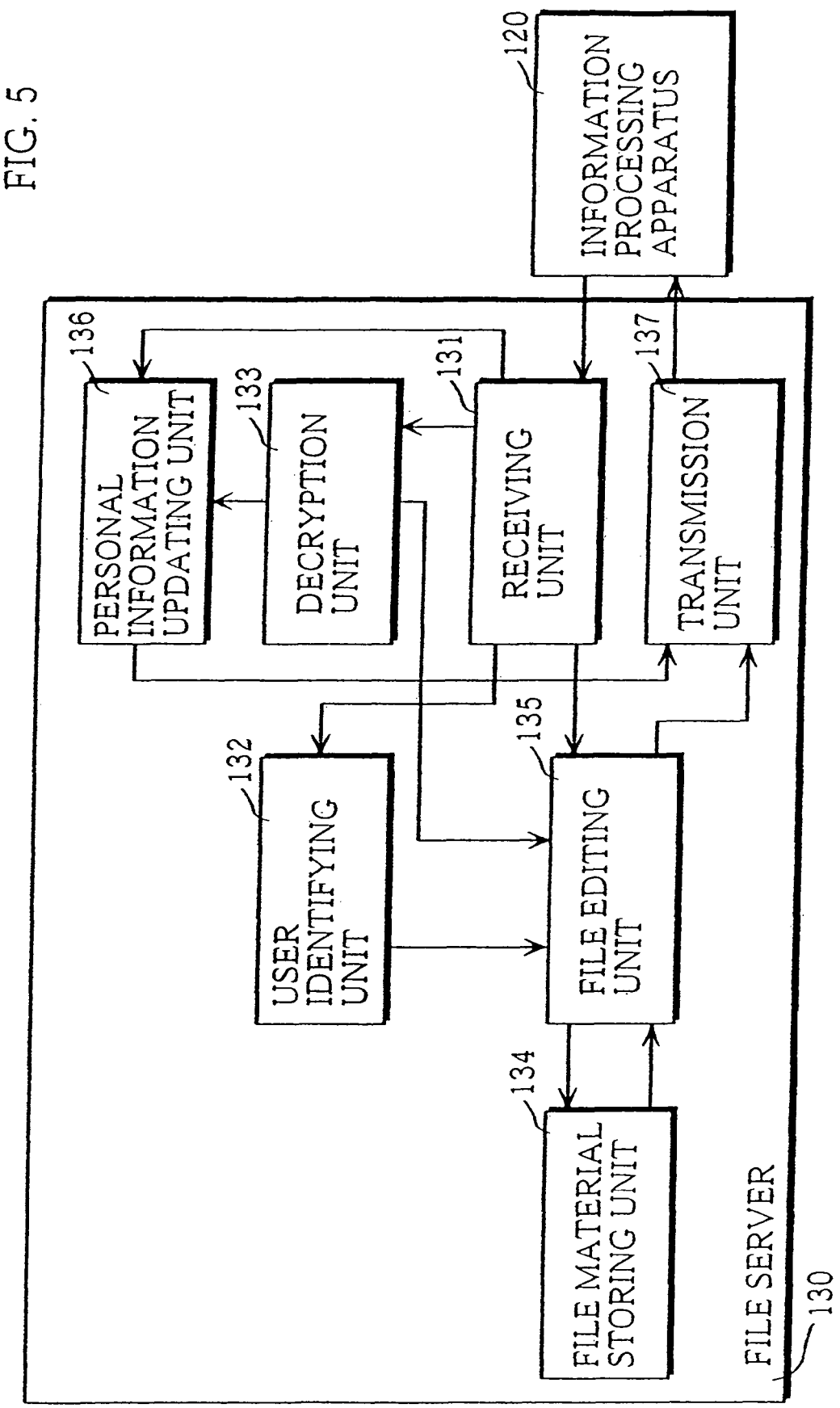
FIG. 5 shows the construction of a file server.

FIG. 5 shows the construction of the file server 130.

As shown in FIG. 5, the file server 130 includes a receiving unit 131, a user identifying unit 132, a decryption unit 133, a file material storing unit 134, a file editing unit 135, a personal information updating unit 136, and a transmission unit 137.

The receiving unit 131 receives a service providing request, a media ID, encrypted personal information, a personal information unregistered notification, and a personal information changing request from the transmission unit 123 of the information processing apparatus 120. The personal information changing request is a request for changing the personal information.

The user identifying unit 132 identifies the user by using the media ID received by the receiving unit 131.

The decryption unit 133 decrypts the encrypted personal information that is received by the receiving unit 131. Here, the decryption unit 133 prestores a secret key that has been obtained under a public key cryptosystem, such as a RSA cryptosystem, and decrypts the encrypted personal information by using the secret key.

The file material storing unit 134 stores file materials that have been classified according to hobbies and tastes of users.

The file editing unit 135 refers to the personal information that is decrypted by the decryption unit 133, and generates a service file by extracting each file material, which corresponds to the user's hobby and taste shown by the decrypted personal information, from the file material storing unit 134 and editing each extracted file material.

The personal information updating unit 136 provides the data for the personal information registration screen, updates the personal information that is decrypted by the decryption unit 133, and encrypts the updated personal information, if the receiving unit receives a personal information unregistered notification or a personal information changing request. Here, the personal information updating unit 136 prestores a public key that has been obtained under a public key cryptosystem, such as a RSA cryptosystem, updates the personal information by changing information concerning the Web site, such as the last date and time the user visited the Web site and the number of times the user has visited the Web site, and encrypts the updated personal information by using the public key.

The transmission unit 137 transmits a media ID transmission request and a personal information transmission request if the receiving unit 131 receives a service providing request. The transmission unit 137 also transmits the service file generated by the file editing unit 135, the data for the personal information registration screen provided by the personal information updating unit 136, and the personal information that has been updated and encrypted by the personal information updating unit 136.

<Operation>

Figure 6:
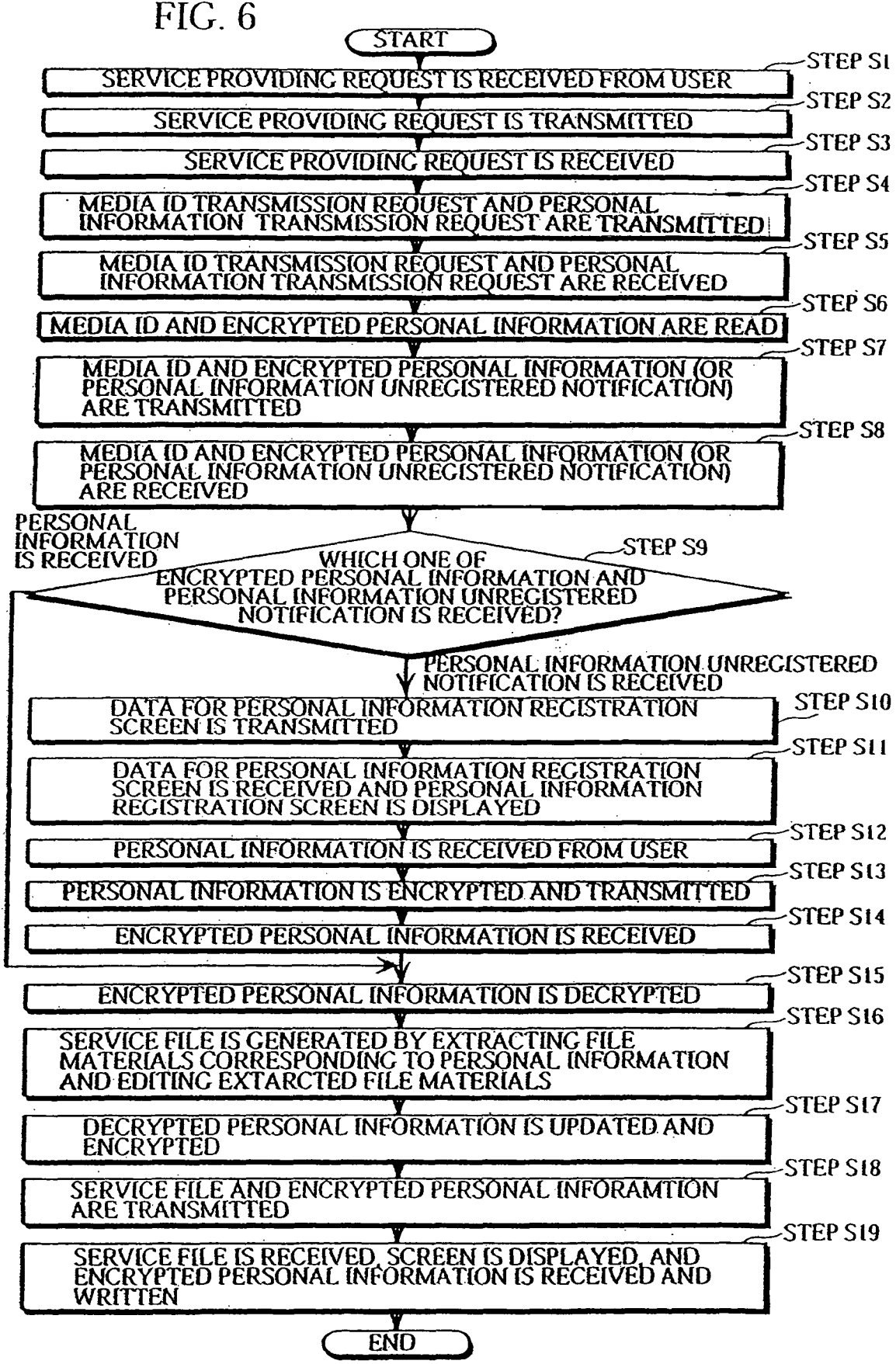
FIG. 6 is a flowchart showing the processing procedure of the information processing system of the first embodiment.

FIG. 6 is a flowchart showing the processing procedure of the information processing system 100 of the first embodiment.

The processing procedure is briefly described below with reference to FIG. 6.

(1) The input unit 121 of the information processing apparatus 120 receives a service providing request from the user (step S1).

(2) The transmission unit 123 of the information processing apparatus 120 transmits the service providing request received by the input unit 121 to the file server 130 (step S2).

(3) The receiving unit 131 of the file server 130 receives the service providing request from the information processing apparatus 120 (step S3).

(4) The transmission unit 137 of the file server 130 transmits a media ID transmission request and a personal information transmission request to the information processing apparatus 120 (step S4)

(5) The receiving unit 125 of the information processing apparatus 120 receives the media ID transmission request and the personal information transmission request from the file server 130 (step S5).

(6) The reading unit 126 reads a media ID from the secure data area 111 of the recording medium 110 according to the media ID transmission request. Also, the reading unit 126 reads encrypted personal information from the non-secure data area 112 of the recording medium 110 according to the personal information transmission request. Needless to say, if no personal information is stored in the non-secure data area 112, the reading unit 126 cannot read personal information from the non-secure data area 112 (step S6).

(7) The transmission unit 123 of the information processing apparatus 120 transmits the media ID and the encrypted personal information read by the reading unit 126 to the file server 130. If the reading unit 126 has not read personal information, the transmission unit 123 transmits a personal information unregistered notification, instead of personal information (step S7).

(8) The receiving unit 131 of the file server 130 receives a pair of the media ID and the encrypted personal information or a pair of the media ID and the personal information unregistered notification. The user identifying unit 132 identifies the user by using the received media ID (step S8).

(9) It is judged whether the receiving unit 131 has received personal information or a personal information unregistered notification (step S9).

(10) If the receiving unit 131 has received a personal information unregistered notification, the personal information updating unit 136 provides the data for the personal information registration screen and the transmission unit 137 transmits the provided data (step S10).

(11) The receiving unit 125 of the information processing apparatus 120 receives the data for the personal information registration screen that is transmitted from the file server 130, and the display unit 127 displays the personal information registration screen (step S11).

(12) The input unit 121 receives personal information inputted by the user through the personal information registration screen (step S12).

(13) The encryption unit 122 encrypts the personal information received by the input unit 121, and the transmission unit 123 transmits the encrypted personal information to the file server 130 (step S13).

(14) The receiving unit 131 of the file server 130 receives the encrypted personal information (step S14).

(15) The decryption unit 133 decrypts the encrypted personal information received by the receiving unit 131 (step S15).

(16) The file editing unit 135 refers to the personal information that is decrypted by the decryption unit 133, and generates a service file by extracting each file material, which corresponds to the user's hobby and taste shown by the decrypted personal information, from the file material storing unit 134 and editing each extracted file material (step S16).

(17) The personal information updating unit 136 updates the personal information that is decrypted by the decryption unit 133 and encrypts the updated personal information (step S17).

(18) The transmission unit 137 transmits the service file generated by the file editing unit 135 and the personal information that is updated and encrypted by the personal information updating unit 136 (step S18).

(19) The receiving unit 125 of the information processing apparatus 120 receives the service file from the file server 130, and the display unit 127 display a service screen for the user according to the received service file. The receiving unit 125 also receives the updated and encrypted personal information, and the writing unit 128 writes the received personal information into the non-secure data area 112 of the recording medium 110 (step S19).

As described above, in the information processing system of the first embodiment, personal information concerning a user is encrypted and stored in a transportable recording medium, and a server reads the personal information from the recording medium, decrypts the read personal information, and customizes a requested service for the user according to the decrypted personal information. To use an information processing apparatus, each user needs to connect a transportable recording medium, which is uniquely assigned to the user and stores personal information of the user, to the information processing apparatus. This allows the file server to correctly handle personal information of each user. In the information processing system of the first embodiment, the security of personal information is also enhanced because personal information that has been encrypted is stored in a transportable recording medium.

It should be noted here that an encryption key may be generated from a media ID, and personal information may be encrypted by using the encryption key and stored in the non-secure data area of a recording medium. Also, an encryption key may be generated from a media ID and a user password designated by a user.

In the first embodiment, encrypted personal information concerning a user is stored in the non-secure data area of a transportable recording medium. However, the encrypted personal information may be stored in the secure data area of the transportable recording medium. In this case, the recording medium does not need to include a non-secure data area.

If a recording medium is not connected to the information processing apparatus or if a recording medium connected to the information processing apparatus does not store personal information, the file server may provide a requested service without customizing the service.

Second Embodiment

<Overview>

In the first embodiment, encrypted personal information concerning a user is stored in a transportable recording medium. In the second embodiment, however, personal information that is not encrypted is stored in a file server.

In this second embodiment, each transportable recording medium stores a media identifier and is uniquely provided to a user. A file server stores personal information of respective users, with the personal information of each user being associated with one media identifier. The file server reads a media identifier from a recording medium, searches for personal information corresponding to the media identifier, and customizes a service according to the corresponding personal information.

In the first embodiment, encrypted personal information is stored and transmitted to enhance the security of personal information. In the second embodiment, although encrypted personal information is transmitted between the information processing apparatus and the file server similar to the first embodiment, personal information that is not encrypted is stored in a file server. This is because there is no security problem in the file server.

<Construction>

Figure 7:
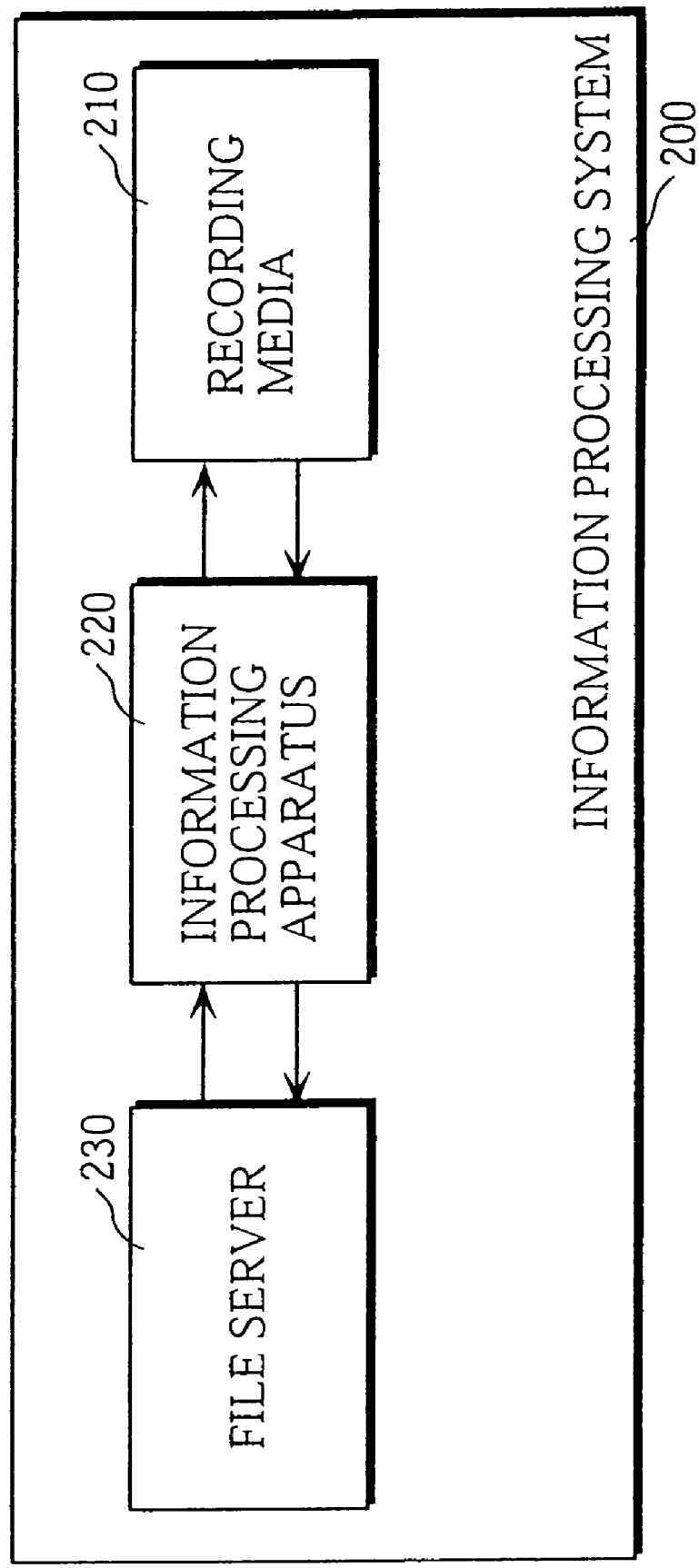
FIG. 7 shows the construction of an information processing system of the second embodiment of the present invention.

FIG. 7 shows the construction of an information processing system 200 of the second embodiment.

As shown in FIG. 7, the information processing system 200 includes a recording medium 210, an information processing apparatus 220, and a file server 230.

The recording medium 210, the information processing apparatus 220, and the file server 230 are respectively similar to the recording medium 10, the information processing apparatus 120, and the file server 130.

The construction elements having the same functions as those of the first embodiment are assigned the same names and reference numerals as in the first embodiment and are not described here.

Figure 8:
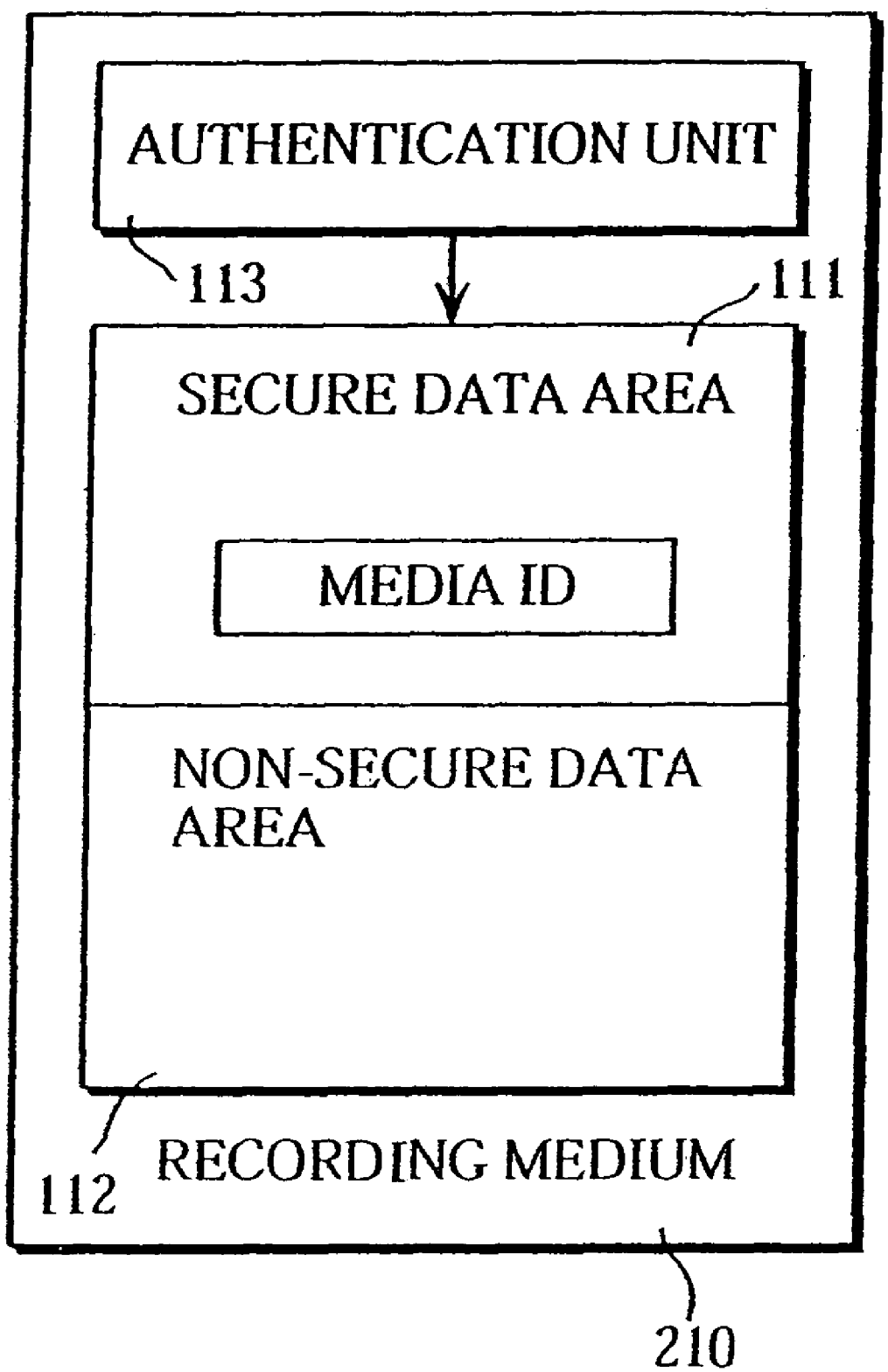
FIG. 8 shows the detailed construction of a recording medium.

FIG. 8 shows the detailed construction of the recording medium 210.

As shown in FIG. 8, the recording medium 210 includes a secure data area 111, a non-secure data area 112, and an authentication unit 113. A media ID is stored in the secure data area 111.

Figure 9:
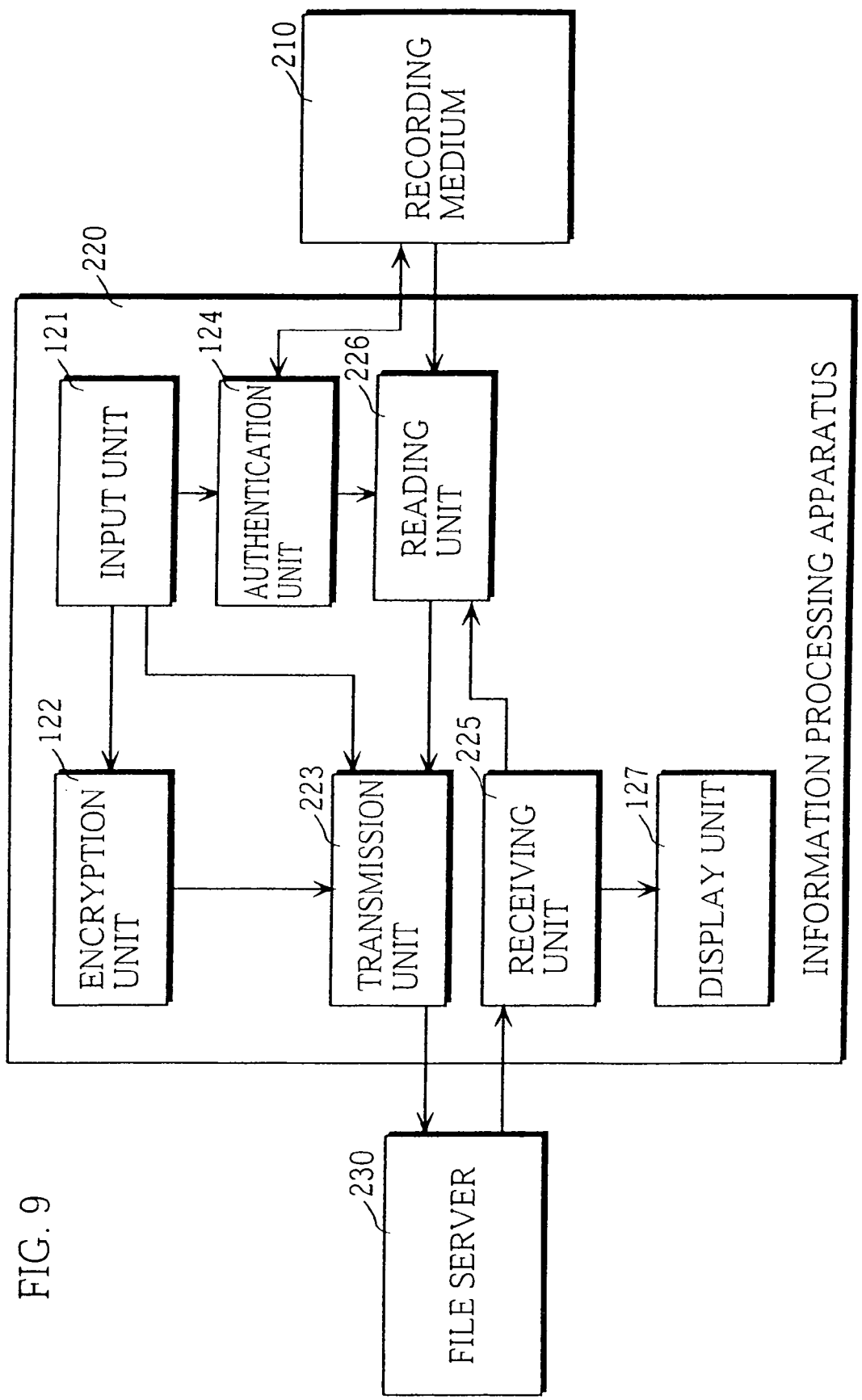
FIG. 9 shows the construction of an information processing apparatus.

FIG. 9 shows the construction of the information processing apparatus 220.

As shown in FIG. 9, the information processing apparatus 220 includes an input unit 121, an encryption unit 122, a transmission unit 223, an authentication unit 124, a receiving unit 225, a reading unit 226, and a display unit 127.

The transmission unit 223 transmits the service providing request received by the input unit 121, the media ID read by the reading unit 226, and the personal information encrypted by the encryption unit 122 to the file server 230. Here, if the reading unit 226 cannot read a media ID, the transmission unit 223 transmits a media ID reading impossible notification, instead of the media ID. The media ID reading impossible notification is a notification showing that the reading unit 226 has not read a media ID.

The receiving unit 225 receives a media ID transmission request, a service file, and data for a personal information registration screen from the file server 230.

The reading unit 226 reads, if a media ID transmission request is received by the receiving unit 225, a media ID from the secure data area 111 of the recording medium 210. It should be noted here that if the device authentication between the recording medium 210 and the information processing apparatus 220 has ended in failure, the access to the secure data area 111 is prohibited so that the reading unit 226 cannot read the media ID from the secure data area 111.

Figure 10:
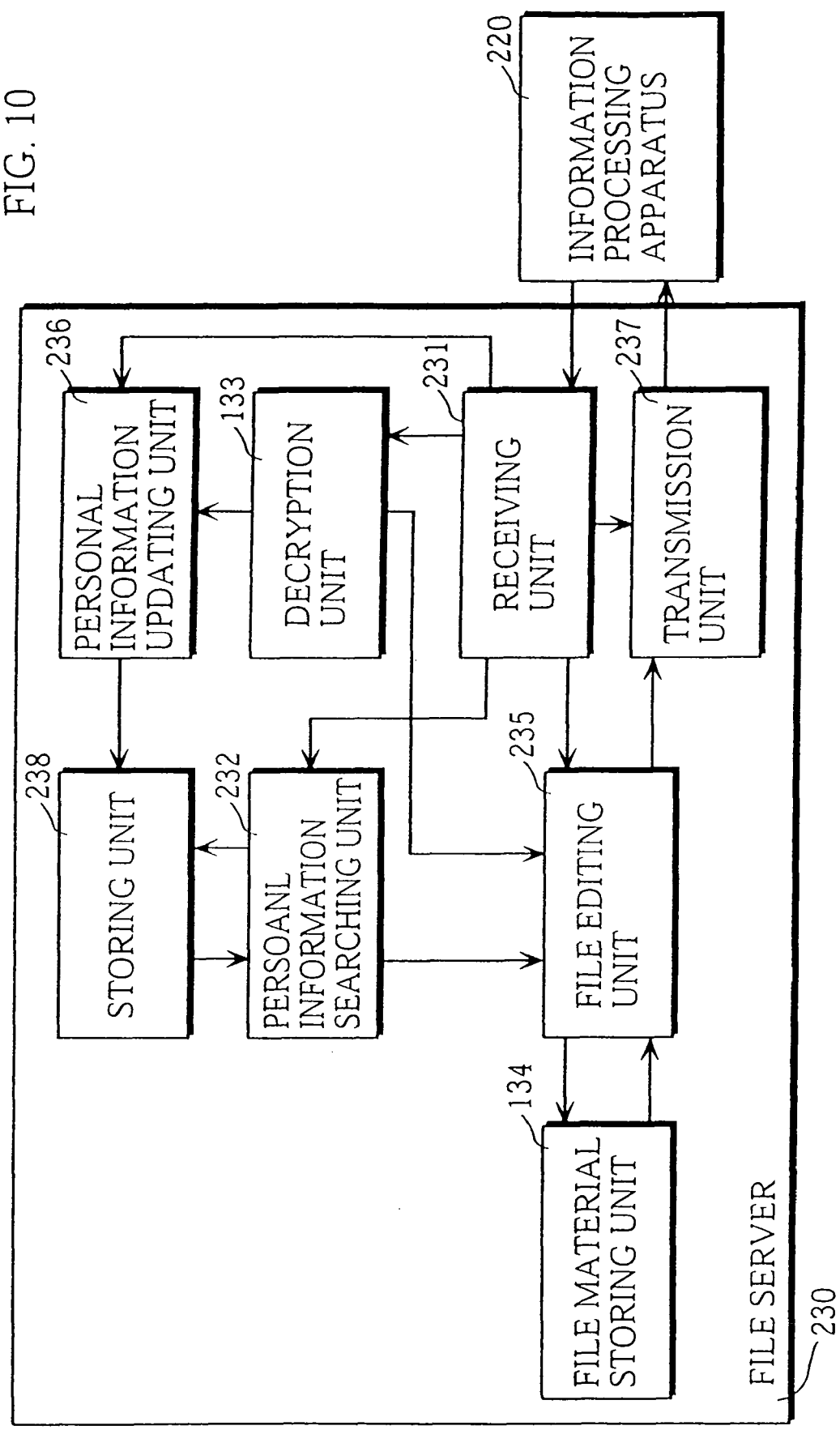
FIG. 10 shows the construction of a file server.

FIG. 10 shows the construction of the file server 230.

As shown in FIG. 10, the file server 230 includes a receiving unit 231, a personal information searching unit 232, a decryption unit 133, a file material storing unit 134, a file editing unit 235, a personal information updating unit 236, a transmission unit 237, and a storing unit 238.

The receiving unit 231 receives a service providing request, a media ID, encrypted personal information, a media ID reading impossible notification, and a personal information changing request from the transmission unit 223 of the information processing apparatus 220.

The personal information searching unit 232 searches the storing unit 238 for personal information that corresponds to the media ID received by the receiving unit 231.

The file editing unit 235 refers to the corresponding personal information and generates a service file by extracting each file material, which corresponds to the user's hobby and taste shown by the personal information, from the file material storing unit 134 and editing each extracted file material. Here, if the receiving unit 231 receives a media ID reading impossible notification instead of a media ID, the file editing unit 235 generates a service file by extracting each file that appeals to all tastes from the file material storing unit 134 and editing each extracted file material.

The personal information updating unit 236 provides the data for the personal information registration screen and updates the personal information stored in the storing unit 238 with the personal information that is decrypted by the decryption unit 133, if the personal information searching unit 232 cannot find personal information corresponding to the media ID received by the receiving unit 231 or if the receiving unit 231 receives a personal information changing request.

The transmission unit 237 transmits a media ID transmission request, a service file generated by the file editing unit 235, and the data for the personal information registration screen that is provided by the personal information updating unit 236 if the receiving unit 231 receives a service providing request.

The storing unit 238 stores personal information of users so that the personal information of each user is associated with the media ID stored in the recording medium provided to the user.

FIG. 11 shows an example of the content of the personal information that is stored in the storing unit 238.

<Operation>

FIG. 12 is a flowchart showing the processing procedure of the information processing system of the second embodiment.

The processing procedure is briefly described below with reference to FIG. 12.

(1) The input unit 121 of the information processing apparatus 220 receives a service providing request from the user (step S21).

(2) The transmission unit 223 of the information processing apparatus 220 transmits the service providing request received by the input unit 121 to the file server 230 (step S22).

(3) The receiving unit 231 of the file server 230 receives the service providing request from the information processing apparatus 220 (step S23).

(4) The transmission unit 237 of the file server 230 transmits a media ID transmission request to the information processing apparatus 220 (step S24).

(5) The receiving unit 225 of the information processing apparatus 220 receives the media ID transmission request from the file server 230 (step S25).

(6) The reading unit 226 reads a media ID from the secure data area 111 of the recording medium 110 according to the media ID transmission request. Here, if the recording medium 210 is not connected to the information processing apparatus 220, the reading unit 226 cannot read the media ID from the secure data area 111. Also, if the device authentication between the recording medium 210 and the information processing apparatus 220 has ended in failure, the information processing apparatus 220 is prohibited from accessing the secure data area 111. In such a case, the reading unit 226 cannot read the media ID from the secure data area 111 (step S26).

(7) The transmission unit 223 of the information processing apparatus 220 transmits the media ID read by the reading unit 226 to the file server 230. If the reading unit 126 cannot read the media ID, the transmission unit 223 transmits a media ID reading impossible notification (step S27).

(8) The receiving unit 231 of the file server 230 receives a media ID or a media ID reading impossible notification from the transmission unit 223 (step S28).

(9) It is judged whether the receiving unit 231 has received a media ID or a media ID reading impossible notification (step S29).

(10) If the receiving unit 231 has received a media ID, the personal information searching unit 232 searches the storing unit 238 for personal information corresponding to the media ID received by the receiving unit 231 (step S30).

(11) The file editing unit 235 refers to the corresponding personal information and generates a service file by extracting each file material, which corresponds to the user's hobby and taste shown by the personal information, from the file material storing unit 134 and editing each extracted file material (step S31).

(12) If the receiving unit 231 has received a media ID reading impossible notification, the file editing unit 235 generates a service file by extracting each file material that appeals to all tastes from the file material storing unit 134 and editing each extracted file material (step S32).

(13) The transmission unit 237 transmits the service file that is generated by the file editing unit 235 (step S33).

(14) The receiving unit 225 of the information processing apparatus 220 receives the service file from the file server 230, and the display unit 127 display a service screen for the user according to the received service file (step S34).

As described above, in the information processing system of the second embodiment, a media ID is stored in a transportable recording medium. A file server receives the media ID that is read by an information processing apparatus, searches for personal information corresponding to the received media ID, and customizes a requested service according to the corresponding personal information. To use an information processing apparatus, each user needs to connect a transportable recording medium, which is uniquely assigned to the user, to the information processing apparatus. This allows the file server to correctly handle personal information of each user.

It should be noted here that each embodiment may be achieved by software. Also, the software may be stored in a computer-readable recording medium, such as a CD-ROM. Like the service providing apparatus, the computer-readable recording medium becomes the subject of production, use, transfer, lease, import, or an offer of transfer or lease.

INDUSTRIAL USE POSSIBILITY

The present invention is applicable to data communication between a user's apparatus and another apparatus, such as the access from an Internet terminal to a Web site. By uniquely providing recording media of the present invention to users, the users are in a one-to-one correspondence with the recording media even if the users are not in a one-to-one correspondence with terminals. Therefore, when a user browses a Web site, personal information of the user is correctly obtained from the user's recording medium. Also, even after replacing an old terminal with a new one, the user can continuously receive the same service by simply connecting the user's recording medium to the new terminal. This facilitates the handling of personal information of the user.

Also, a Web site does not specify a user without a recording medium being connected to a terminal. Therefore, the security of personal information is enhanced without difficulty by managing the recording media provided to users.

Further, the transportable recording medium of the present invention may store cookie information that is obtained through an Internet browser. This reduces the possibility that the cookie information may be maliciously read, causing a user's privacy to be violated or making the user a victim of cyber fraud.

What is claimed is:

1. A service providing method of providing a current user of a first apparatus with each service provided by one or more other apparatuses via a network, wherein the first apparatus is able to communicate with each of the one or more other apparatuses via the network and is locally connectable to a transportable recording medium assigned to the current user from among a plurality of transportable recording media that are assigned to users of the first apparatus, each of the plurality of transportable recording media has recorded thereon a media identifier unique thereto, and the transportable recording medium includes a non-secure data area for storing encrypted user information which is generated by encrypting user information assigned to the current user based on the media identifier, the service providing method comprising:

a service requesting operation of the first apparatus requesting a second apparatus to provide a service desired by the current user, the second apparatus being one of the one or more other apparatuses;

a reading operation of, when the transportable recording medium of the current user is locally connected to the first apparatus, the second apparatus reading the media identifier unique to the transportable recording medium assigned to the current user and the encrypted user information assigned to the current user, from the transportable recording medium locally connected to the first apparatus via the network, the user information assigned to the current user being associated with the media identifier unique to the transportable recording medium assigned to the current user by encrypting the user information based on the media identifier, the encrypted user information associating the user information assigned to the current user with the media identifier unique to the transportable recording medium assigned to the current user, the transportable recording medium including a secure data area and the non-secure data area, the encrypted user information being stored in the non-secure data area, the media identifier being stored in the secure data area and requiring an authentication between the first apparatus and the transportable recording medium in order to access the media identifier; and a service providing operation of the second apparatus of
(i) generating a decryption key based on the media identifier read in said reading operation,
(ii) generating user information by decrypting the encrypted user information read in said reading operation by using the generated decryption key,
(iii) customizing the desired service according to the generated user information, and
(iv) transmitting the customized service to the first apparatus.

2. The service providing method of claim 1, further comprising:
a user information updating operation, which is performed after said reading operation, of the second apparatus, when the user information inherent to the current user needs to be updated, updating the user information and generating encrypted updated user information by encrypting updated user information, and overwriting the encrypted user information in the locally connected transportable recording medium with the encrypted updated user information via the network and the first apparatus.

3. The service providing method of claim 2, wherein in said user information updating operation, which is performed after said reading operation, the second apparatus:
generates updated decrypted user information by updating the decrypted user information,
generates encrypted updated user information by encrypting the updated decrypted user information such that the encrypted user information can be decrypted with use of the generated decryption key, and
overwrites the encrypted user information in the locally connected transportable recording medium with the encrypted updated user information.

4. The service providing method of claim 3, wherein:
the network is the Internet;
the first apparatus is an Internet terminal operable to run a specialized Internet browser;
each of the one or more other apparatuses is a Web site;
the user information includes cookie information used through the Internet browser; and
each transportable recording medium stores the cookie information as a file.

5. The service providing method of claim 1, wherein:
the user information stored in each transportable recording medium includes the media identifier of the transportable recording medium;
the second apparatus stores user information so that user information assigned to each user is associated with the media identifier of the transportable recording medium assigned to the user; and
said service providing operation includes:
a user information finding operation of the second apparatus finding user information associated with the media identifier that has been read in said reading operation, and
a customizing operation of the second apparatus customizing the desired service for the current user according to the user information found in said user information finding operation.

6. The service providing method of claim 1, further comprising:
a transportable recording medium connection operation, which is performed before said service requesting operation, of locally connecting the first apparatus to the transportable recording medium assigned to the current user.

7. The service providing method of claim 1, wherein:
each transportable recording medium includes a secure data area; and
said reading operation includes:
a device authentication operation of performing a device authentication between the first apparatus and the locally connected transportable recording medium, and
a reading prohibition operation of, when the device authentication performed in said device authentication operation has ended in failure, prohibiting the second apparatus from reading the media identifier and data from the secure data area of the locally connected transportable recording medium.

8. A service providing method used by a first apparatus operable to receive each service provided by one or more other apparatuses via a network and provide the received service to a current user of the first apparatus, wherein the first apparatus is able to communicate with each of the one or more other apparatuses via the network and is locally connectable to a transportable recording medium assigned to the current user from among a plurality of transportable recording media that are assigned to users of the first apparatus, each of the plurality of transportable recording media has recorded thereon a media identifier unique thereto, and the transportable recording medium includes a non-secure data area for storing encrypted user information which is generated by encrypting user information assigned to the current user based on the media identifier, the service providing method comprising:
a service requesting operation of the first apparatus requesting a second apparatus to provide a service desired by the current user, the second apparatus being one of the one or more other apparatuses;
a transmitting operation of, when the transportable recording medium of the current user is locally connected to the first apparatus and stores encrypted user information assigned to the current user, the first apparatus reading the media identifier unique to the transportable medium assigned to the current user and the encrypted user information assigned to the current user, from the transportable recording medium locally connected to and transmitting the read media identifier and encrypted user information to the second apparatus via the network, the user information assigned to the current user being associated with the media identifier unique to the transportable recording medium assigned to the current user by encrypting the user information based on the media identifier, the encrypted user information associating the user information assigned to the current user with the media identifier unique to the transportable recording medium assigned to the current user, the transportable recording medium including a secure data area and the non-secure data area, and the encrypted user information being stored in the non-secure data area, the media identifier being stored in the secure data area and requiring an authentication between the first apparatus and the transportable recording medium in order to access the media identifier; and
a service providing operation of the first apparatus receiving a service that has been customized by the second apparatus from the second apparatus and providing the received service to the current user, wherein the second apparatus generates the customized service by (i) generating a decryption key based on the media identifier that has been transmitted to the second apparatus in said transmitting operation, (ii) generating user information by decrypting, by using the generated decryption key, the encrypted user information that has been transmitted to the second apparatus, and (iii) customizing a desired service according to the generated user information.

9. The service providing method of claim 8, further comprising:

a user information updating operation, which is performed after said transmitting operation, of the first apparatus, when the user information assigned to the current user needs to be updated, receiving information based on updated user information from the second apparatus and overwriting the encrypted user information in the locally connected transportable recording medium with the updated user information.

10. The service providing method of claim 9, wherein in said user information updating operation, the first apparatus receives encrypted user information that has been encrypted by the second apparatus such that the encrypted user information can be decrypted with use of the generated decryption key, and overwrites the encrypted user information in the locally connected transportable recording medium with the received encrypted user information.

11. The service providing method of claim 10, wherein:
the network is the Internet;
the first apparatus is an Internet terminal operable to run a specialized Internet browser;
each of the one or more other apparatuses is a Web site;
the user information includes cookie information used through the Internet browser; and
each transportable recording medium stores the cookie information as a file.

12. The service providing method of claim 8, wherein:
the second apparatus stores user information so that user information inherent to each user is associated with the media identifier of the transportable recording medium assigned to the user; and
the customized service that is received and provided in said service providing operation is generated at the second apparatus by finding user information associated with the media identifier transmitted in said transmitting operation and customizing the desired service for the current user according to the found user information.

13. The service providing method of claim 8, further comprising:

a transportable recording medium connection operation, which is performed before said service requesting operation, of locally connecting the first apparatus to the transportable recording medium assigned to the current user.

14. The service providing method of claim 13, wherein:
each transportable recording medium includes a secure data area;
the media identifier of each transportable recording medium is stored in the secure data area of the transportable recording medium; and
said transmitting operation includes:
a device authentication operation of performing a device authentication between the first apparatus and the locally connected transportable recording medium, and
a transmitting prohibition operation of, if the device authentication performed in said device authentication operation has ended in failure, prohibiting the first apparatus from transmitting the media identifier and data to the secure data area of the locally connected transportable recording medium.

15. A service providing method of providing a current user of a first apparatus with each service provided by one or more other apparatuses via a network, wherein the first apparatus is able to communicate with each of the one or more other apparatuses via the network and includes a recording medium assigned to the current user, each of the plurality of the recording media has recorded thereon a media identifier unique thereto, and the recording medium includes a non-secure data area for storing encrypted user information which is generated by encrypting user information assigned to the current user based on the media identifier, the service providing method comprising:

a service requesting operation of the first apparatus requesting a second apparatus to provide a service desired by the current user, the second apparatus being one of the one or more other apparatuses;

a reading operation of the second apparatus reading the media identifier unique to the medium assigned to the current user and the encrypted user information assigned to the current user, from the recording medium via the network, the user information assigned to the current user being associated with the media identifier unique to the recording medium assigned to the current user by encrypting the user information based on the media identifier, the encrypted user information associating the user information assigned to the current user with the media identifier unique to the recording medium assigned to the current user, the recording medium including a secure data area and the non-secure data area, the encrypted user information being stored in the non-secure data area, the media identifier being stored in the secure data area and requiring an authentication between the first apparatus and the transportable recording medium in order to access the media identifier; and a service providing operation of the second apparatus of
(i) generating a decryption key based on the media identifier read in said reading operation,
(ii) generating user information by decrypting the encrypted user information read in said reading operation by using the generated decryption key,
(iii) customizing the desired service according to the generated user information, and
(iv) transmitting the customized service to the first apparatus.

16. A service providing method of providing a current user of a first apparatus with each service provided by one or more other apparatuses via a network, wherein the first apparatus is able to communicate with each of the one or more other apparatuses via the network and is locally connectable to a transportable recording medium assigned to the current user from among a plurality of transportable recording media that are assigned to users of the first apparatus, each of the plurality of transportable recording media has recorded thereon a media identifier unique thereto, and the transportable recording medium includes a non-secure data area for storing encrypted user information which is generated by encrypting user information assigned to the current user based on the media identifier, the service providing method comprising:

a service requesting operation of the first apparatus requesting a second apparatus to provide a service desired by the current user, the second apparatus being one of the one or more other apparatuses;

a reading operation of, when the transportable recording medium of the current user is locally connected to the first apparatus, the second apparatus reading the media identifier unique to the transportable medium assigned to the current user and the encrypted user information assigned to the current user, from the transportable recording medium locally connected to the first apparatus via the network, the user information assigned to the current user being associated with the media identifier unique to the transportable recording medium assigned to the current user by encrypting the user information based on the media identifier, the encrypted user information associating the user information assigned to the current user with the media identifier unique to the transportable recording medium assigned to the current user, the transportable recording medium including a secure data area and the non-secure data area, and the encrypted user information being stored in the non-secure data area, the media identifier being stored in the secure data area and requiring an authentication between the first apparatus and the transportable recording medium in order to access the media identifier; and a service providing operation of the second apparatus
- (i) generating a decryption key based on the media identifier read in said reading operation,
- (ii) generating user information by decrypting the encrypted user information read in said reading operation by using the generated decryption key,
- (iii) customizing the desired service according to the generated user information, and
- (iv) transmitting the customized service to the first apparatus.

* * * * *